United States Patent
Manhart

(10) Patent No.: US 12,165,281 B2
(45) Date of Patent: Dec. 10, 2024

(54) STREAK ARTIFACT CORRECTION

(71) Applicant: Siemens Healthcare GmbH, Erlangen (DE)

(72) Inventor: Michael Manhart, Fuerth (DE)

(73) Assignee: SIEMENS HEALTHINEERS AG, Forchheim (DE)

( * ) Notice: Subject to any disclaimer, the term of this patent is extended or adjusted under 35 U.S.C. 154(b) by 193 days.

(21) Appl. No.: 17/152,944

(22) Filed: Jan. 20, 2021

(65) Prior Publication Data

US 2021/0233215 A1    Jul. 29, 2021

(30) Foreign Application Priority Data

Jan. 29, 2020   (DE) .................... 10 2020 201 047.1

(51) Int. Cl.
*G06T 5/00*   (2024.01)

(52) U.S. Cl.
CPC ...... *G06T 5/00* (2013.01); *G06T 2207/10081* (2013.01)

(58) Field of Classification Search
CPC ...................... G06T 5/001; G06T 2207/10081
See application file for complete search history.

(56) References Cited

U.S. PATENT DOCUMENTS

| | | | |
|---|---|---|---|
| 7,471,814 B2 * | 12/2008 | Raman | G06T 5/50 |
| | | | 600/407 |
| 2008/0267484 A1 | 10/2008 | Chen | |
| 2015/0092907 A1 | 4/2015 | Dong et al. | |
| 2016/0078647 A1 | 3/2016 | Schildkraut et al. | |
| 2016/0324499 A1 * | 11/2016 | Sen Sharma | A61B 6/5258 |

FOREIGN PATENT DOCUMENTS

| | | | | |
|---|---|---|---|---|
| CA | 2553508 A1 * | 1/2007 | | G06T 17/20 |
| CN | 102609908 A | 7/2012 | | |
| CN | 103310432 A | 9/2013 | | |
| EP | 3404615 A1 | 11/2018 | | |
| EP | 3591611 A1 * | 1/2020 | | A61B 6/032 |

OTHER PUBLICATIONS

Haase, C. et al., "First pass cable artefact correction for cardiac C-arm CT imaging", Physics in Medicine & Biology, 59(14), pp. 3861-3875, 2014.

(Continued)

*Primary Examiner* — Wednel Cadeau
(74) *Attorney, Agent, or Firm* — Harness, Dickey & Pierce, P.L.C.

(57) ABSTRACT

A computer-implemented method is for the correction of streak artifacts in slice images. In an embodiment, the method includes: receiving at least one initially reconstructed slice image by a processor, the at least one initially reconstructed slice image being based on a plurality of initial projection images; determining at least one variation slice image, via the processor, using a variation algorithm, the at least one variation slice image being based on the at least one initially reconstructed slice image; determining at least one variation projection image based upon the at least one variation slice image; and determining at least one corrected slice image as a function of the at least one variation projection image.

18 Claims, 6 Drawing Sheets

(56) References Cited

OTHER PUBLICATIONS

Müller, M. et al., Metal Segmentation, Technical Report, Chimera GmbH.
German Office Action for German Application No. 102020201047.1 dated Nov. 2, 2020.
Ma, Jiming et al: "Total Variation Constrained Iterative Filtered Backprojection CT Reconstruction Method"; Feb. 28, 2015; Acta Optica Sinica, Bd. 35, Nr. 2.
Huo Qirun et al:"Variation-based Ring Artifact Correction", p. 1713-1726, Acta Automatica Sinica, vol. 45, No. 9, DOI 10.16383/j.aas.c180258, Sep. 30, 2019.

* cited by examiner

STREAK ARTIFACT CORRECTION

PRIORITY STATEMENT

The present application hereby claims priority under 35 U.S.C. § 119 to German patent application number DE 102020201047.1 filed Jan. 29, 2020, the entire contents of which are hereby incorporated herein by reference.

FIELD

An example embodiment of the application generally relates invention to a computer-implemented method for the correction of streak artifacts in slice images. Example embodiments of the application further generally relate to a streak artifact correction unit, a computed tomography device, a computer program product and a computer-readable medium.

BACKGROUND

A slice image in e.g. computed tomography imaging, C-arm imaging or X-ray tomography imaging is typically determined from a plurality of projection images. For this purpose, an object is typically projected via X-radiation onto a detector or X-ray detector or radiation detector. The depiction of at least one object having particularly high X-ray density in at least one projection image of the plurality of projection images can produce streak artifacts in the slice image. The object having high X-ray density results in high attenuation values of the intensity of X-radiation after penetration of the object relative to the intensity of X-radiation before penetration of the object in the at least one projection image. High X-ray density in this context means that the object absorbs more X-radiation than surrounding tissue. The object is therefore highly absorbent.

The object having high X-ray density can be an object made of metal, for example. Established methods such as normalized metal artifact reduction (NMAR) can reduce such streak artifacts, but require the metal object (object made of metal) to be masked out in the slice image. If the metal object is however situated outside the slice image that can be reconstructed, and is only visible in some of the plurality of projection images, such methods cannot be applied.

A metal object which is situated outside the slice image that can be reconstructed from the plurality of projection images must be masked out directly in the at least one projection image in which the metal object is visible. The masking out can be performed in the at least one projection image as a function of the attenuation values or intensity values produced by the metal object. In particular, a technique can be applied which is based on threshold values.

For this purpose, a threshold value is defined by which the at least one projection image is divided into two regions: the region which has to be masked out and the region which does not have to be masked out. In this case, it is also possible for an anatomical object having high X-ray density such as e.g. a bone to be erroneously masked out, since very high attenuation values on the at least one projection image can be caused not only by the metal object but also by such an anatomical object. The anatomical object, e.g. a bone, produces high attenuation values particularly if a correspondingly long portion of an X-ray beam passes through the anatomical object. However, such an object does not produce any streak artifacts in some circumstances.

Therefore simple threshold value-based techniques alone cannot be successfully deployed to mask out the metal object. Learning-based methods for projection-based metal masking have therefore been described (Malte Müller: Metal Segmentation, Technical Report, Chimera GmbH). However, such learning-based methods for projection-based metal masking require a large amount of annotated training data. In particular, such learning-based methods produce "false-positive" and "false-negative" errors in the masking out. It is currently difficult to obtain sufficient annotated training data since the annotation is time-intensive.

Alternatively, a method has been proposed in which the masking out involves more rapid movement of a cable (e.g. of a heart pacemaker) along columns of the at least one projection image in comparison with the background (Haase, C. et al. (2014). First pass cable artefact correction for cardiac C-arm CT imaging. Physics in Medicine & Biology, 59(14), 3861).

SUMMARY

The inventors have discovered that until now, the above-mentioned method has only been used successfully for cable-shaped objects.

At least one embodiment of the present invention is directed to masking out objects having high X-ray density, which produce streak artifacts in a slice image, in at least one projection image.

Embodiments are directed to a computer-implemented method for the correction of streak artifacts in slice images; a streak artifact correction unit; a computed tomography device; a computer program product and a computer-readable medium. Advantageous embodiments of the invention are the subject matter of the claims.

Inventive solution embodiments, in respect of both the embodiments of the devices and the method, are described in the following. Features, advantages or alternative embodiment variants cited in this context are applicable analogously to the other claimed subject matters and vice versa. In other words, the material claims (which are directed to a device, for example) can also be developed using the features that are described or claimed in connection with a method. The corresponding functional features of the method take the form of corresponding material modules in this case.

At least one embodiment of the invention relates to a computer-implemented method for the correction of streak artifacts in slice images. The computer-implemented method for the correction of streak artifacts in slice images comprises a method step of a first reception of at least one initially reconstructed slice image by a processor, said at least one initially reconstructed slice image being based on a plurality of initial projection images. The computer-implemented method further comprises a method step of a first determination of at least one variation slice image by the processor using a variation algorithm, the at least one variation slice image being based on the at least one initial slice image, a method step of a second determination of at least one variation projection image on the basis of the at least one variation slice image, and a method step of a third determination of at least one corrected slice image as a function of the at least one variation projection image.

In particular, an embodiment of the invention also relates to a streak artifact correction unit. The streak artifact correction unit comprises an interface and a computing unit. In this case, the interface is designed for the first reception of at least one initially reconstructed slice image and a plurality of initial projection images, the at least one initially reconstructed slice image being based on the plurality of initial projection images. In this case, the computing unit is designed for the first determination of at least one variation slice image using a variation algorithm, for the second determination of at least one variation projection image on the basis of the at least one variation slice image, and for the third determination of at least one corrected slice image as a function of the at least one variation projection image.

At least one embodiment of the invention also relates to a computer program product with a computer program and a computer-readable medium. A largely software-based implementation has the advantage that streak artifact correction units already in use can easily be upgraded via a software update in order to work in the way described. In addition to the computer program, such a computer program product can optionally comprise additional elements such as e.g. documentation and/or additional components, as well as hardware components such as e.g. hardware keys (dongles, etc.) for using the software.

According to an embodiment of the invention, the streak artifact correction unit is further designed to execute an embodiment of the method described above for the correction of streak artifacts in slice images.

In particular, at least one embodiment of the invention relates to a computed tomography device comprising the streak artifact correction unit described above.

In particular, at least one embodiment of the invention also relates to a computer program product with a computer program which can be loaded directly into a memory of a streak artifact correction unit, with program sections for executing all steps of an embodiment of the method described above for the correction of streak artifacts in slice images when the program sections are executed by the streak artifact correction unit.

In particular, at least one embodiment of the invention further relates to a computer-readable storage medium on which are stored program sections that can be read and executed by a streak artifact correction unit in order to execute all steps of an embodiment of the method described above for the correction of streak artifacts in slice images when the program sections are executed by the streak artifact correction unit.

At least one embodiment of the invention further relates to a computer-implemented method, comprising:
receiving at least one initially reconstructed slice image by a processor, the at least one initially reconstructed slice image being based on a plurality of initial projection images;
determining at least one variation slice image, via the processor, using a variation algorithm, the at least one variation slice image being based on the at least one initially reconstructed slice image;
determining at least one variation projection image based upon the at least one variation slice image; and
determining at least one corrected slice image as a function of the at least one variation projection image.

At least one embodiment of the invention further relates to a streak artifact correction unit, comprising:
an interface, designed to receive at least one initially reconstructed slice image and a plurality of initial projection images, the at least one initially reconstructed slice image being based on the plurality of initial projection images; and
at least one processor, designed to
determine at least one variation slice image using a variation algorithm,
determine at least one variation projection image based upon the at least one variation slice image, and
determine at least one corrected slice image as a function of the at least one variation projection image.

At least one embodiment of the invention further relates to a computed tomography device comprising the streak artifact correction unit of an embodiment.

At least one embodiment of the invention further relates to a non-transitory computer program product storing a computer program, directly loadable into a memory of a streak artifact correction unit, including program sections for executing the method of an embodiment when the program sections are executed by the streak artifact correction unit.

At least one embodiment of the invention further relates to a non-transitory computer-readable storage medium storing program sections, readable and executable by a streak artifact correction unit, to execute the method of an embodiment when the program sections are executed by the streak artifact correction unit.

BRIEF DESCRIPTION OF THE DRAWINGS

For a further description of embodiment variants and advantages of the invention, reference is made to the example embodiments shown in the drawing figures, in which.

DETAILED DESCRIPTION OF THE EXAMPLE EMBODIMENTS

Figure 1:
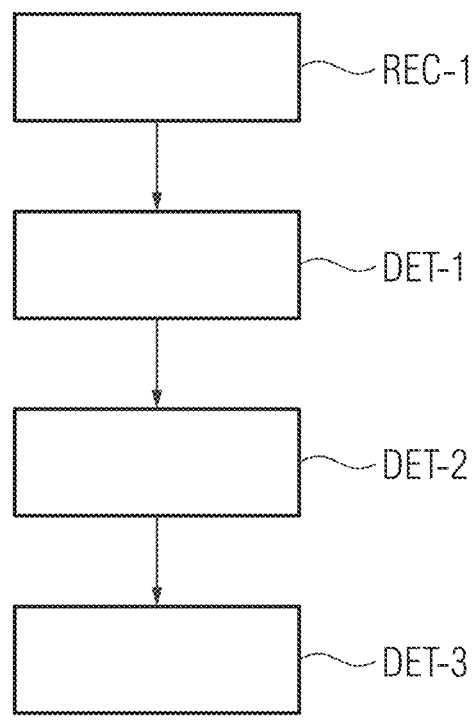
FIG. 1 shows a flow diagram of a first example embodiment of the method for the correction of streak artifacts in slice images.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. At least one embodiment of the present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature (s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

At least one embodiment of the invention relates to a computer-implemented method for the correction of streak artifacts in slice images. The computer-implemented method for the correction of streak artifacts in slice images comprises a method step of a first reception of at least one initially reconstructed slice image by a processor, said at least one initially reconstructed slice image being based on a plurality of initial projection images. The computer-implemented method further comprises a method step of a first determination of at least one variation slice image by the processor using a variation algorithm, the at least one variation slice image being based on the at least one initial slice image, a method step of a second determination of at least one variation projection image on the basis of the at least one variation slice image, and a method step of a third determination of at least one corrected slice image as a function of the at least one variation projection image.

The plurality of initial projection images can be recorded using a computed tomography device or a C-arm or an X-ray tomography device, for example. Each of the plurality of initial projection images advantageously comprises a projection of at least one part of an examination object. The examination object can be a patient, an animal or an object, for example. The initial projection images are advantageously recorded from various angles or directions or recording angles relative to the examination object. In other words, the plurality of initial projection images are recorded from a plurality of recording angles. The plurality of recording angles describes an angular range. The angular range can comprise, for example, a range between 0° and 120° up to a range between 0° and 360°. In particular, the recording angles of two initial projection images are mutually different.

Each initial projection image of the plurality of initial projection images comprises a plurality of pixels. Each pixel comprises a pixel value. The pixel value of a pixel of the plurality of pixels of each initial projection image describes an intensity value. The intensity value is determined by the properties, in particular the absorption properties, of the examination object. In particular, the plurality of pixels of an initial projection image can be arranged in a pixel matrix. The pixel matrix is advantageously two-dimensional. In particular, the pixel values of the pixels of an initial projection image, said pixels being arranged in the pixel matrix, can describe a two-dimensional image or a two-dimensional projection of the examination object. This applies to all of the projection images and masks described in the following. Differing properties of the projection images and masks described in the following, in particular with regard to the corresponding intensity values or pixel values, are explained in the corresponding context.

At least one initially reconstructed slice image or initial slice image can be reconstructed or computed from the plurality of initial projection images via a filtered back projection, for example. The expressions "initially reconstructed slice image" and "initial slice image" are used synonymously in the following.

The at least one initial slice image comprises a plurality of voxels. Each voxel of the plurality of voxels comprises a voxel value. The voxel values describe intensity values. The voxel values can be specified in Hounsfield units, for example. In particular, the voxels can be arranged in a voxel matrix. In particular, the voxel values of an initial slice image are arranged in a two-dimensional or three-dimensional voxel matrix. In particular, the at least one initial slice image can comprise a representation of the examination object in a plane perpendicular to the planes of all initial projection images. This applies likewise to all slice images described in the following. Differing properties of the slice images described in the following, in particular with regard to the corresponding intensity values or voxel values, are explained in the corresponding context.

An object having high X-ray density, which object is visible on at least some of the initial projection images, can produce streak artifacts in the at least one initial slice image. In particular, the object may comprise a partial region of the examination object. Alternatively, the object may be in contact with the examination object or resting on the examination object, such that its projection is visible on at least some of the projection images.

In particular, the object having high X-ray density may be visible on only some of the initial projection images. In particular, the object having high X-ray density cannot then be correctly represented in the at least one slice image. In particular, the object having high X-ray density cannot then be masked out in order to reduce the streak artifacts in the at least one slice image. In particular, the object having high X-ray density must then already be masked out on those initial projection images on which it is visible.

In particular, for this purpose, it is determined which pixels in the plurality of initial projection images are responsible for the streak artifacts in the at least one slice image. In other words, it is determined which pixels represent the object having high X-ray density that causes the streak artifacts. This can also be a single pixel in some cases. The determination of the pixels is effected as a function of the streak artifacts in the at least one slice image. This means that threshold value-based masking out on the plurality of initial projection images in order to remove the streak artifacts is advantageously not necessary. Using the method described in the following, it is advantageously possible to determine which pixels in the plurality of initial projection images contribute to the streak artifacts. This prevents erroneous masking out in the projection images.

Masking out means that the corresponding pixel values in the plurality of initial projection images, which contribute to the streak artifacts, are replaced by a zero value or a NaN value (Not a Number value). Alternatively, these pixel values can also be replaced by interpolation values of the pixel values of the edge regions of the masked-out region in the pixel matrix. In particular, masking out can also mean that the corresponding pixel values in a plurality of projection images that are based on the initial projection images are replaced by a zero value or a NaN value (Not a Number value) or an interpolation value.

In a first method step, the at least one variation slice image is determined from the at least one initial slice image using a variation algorithm. In particular, the voxels of the variation slice image comprise a variation value. The variation slice image advantageously describes the variation between voxel values of adjacent voxels in the at least one initial slice image. In other words, the at least one variation slice image comprises information about the variation of the intensity values or Hounsfield units or voxel values of the at least one initial slice image. Adjacent voxels are arranged next to each other in the voxel matrix.

The variation of the voxel values between adjacent voxels is advantageously particularly large in the case of streak artifacts. The variation between voxel values in the case of a slice image without streak artifacts is advantageously steady and slight if the examination object does not cause any significant intensity jumps in the slice image. Significant intensity jumps in a slice image can occur, for example, as a result of the transition between a bone and a soft tissue surrounding the bone. Such intensity jumps, like the streak artifacts, result in a significant variation or at least a significant variation value. A significant variation can be, for example, a variation value which lies outside a one-sigma interval around a mean value of all variation values.

In a further method step, at least one variation projection image is determined from the variation slice image. The variation projection image is advantageously determined via a forward projection of the at least one variation slice image. The forward projection is advantageously the inverse function of the filtered back projection. In particular, the pixels of the at least one variation projection image comprise a variation value. In particular, the at least one variation projection image can be assigned to an initial projection image from the plurality of initial projection images. In particular, the same examination object from the same recording angle is depicted in the projection images that are assigned to each other. In this case, the initial projection image comprises the intensity values of the projection of the examination object, and the variation projection image comprises the forward-projected variation of the intensity values from the initial slice image.

In a further method step, at least one corrected slice image is determined on the basis of the at least one variation projection image and at least some of the plurality of initial projection images. The at least one variation projection image advantageously describes which pixels in the plurality of initial projection images contribute to the streak artifacts. In particular, the at least one variation projection image describes which pixels in the corresponding initial projection image contribute to the streak artifacts.

In particular, these pixels in the initial projection images or in the corresponding initial projection image can be masked out. In particular, these pixels can be masked out in a filtered projection image which is based on the initial projection image, or in a corresponding filtered projection image which is based on the corresponding initial projection image. This masked-out projection image or these masked-out projection images are referred to as a corrected projection image or corrected projection images in the following. In particular, the expression "filtered projection images" can also be used synonymously with "filtered initial projection images". The filtered projection image is determined by filtering the initial projection image. In particular, the filter can be a ramp filter. In particular, a plurality of filtered projection images can be determined by filtering all initial projection images.

In particular, the corrected projection image can replace the corresponding initial projection image in the plurality of initial projection images or the corresponding filtered projection image in the plurality of filtered projection images. Alternatively, the corrected projection images can replace the corresponding initial projection images or the corresponding filtered projection images. In particular, the corrected slice image can be determined from the corrected projection image or from the corrected projection images and the remaining initial projection images or the remaining filtered projection images. The determination of the at least one corrected slice image is advantageously effected via back projection or filtered back projection.

The determination of the at least one corrected slice image is advantageously effected using back projection if the corrected projection image or the corrected projection images were determined on the basis of the filtered projection image or filtered projection images. If the corrected projection image or corrected projection images were determined on the basis of an initial projection image or the initial projection images, the corrected slice image is determined via filtered back projection. The at least one corrected slice image advantageously comprises no streak artifacts. Alternatively, the streak artifacts in the at least one corrected slice image are smaller than in the initial slice image.

The inventors have found that it is advantageous to mask out, on the initial projection images, an object which causes streak artifacts in the initial slice image. In particular, the inventors have found that the object, or the pixels representing the object in at least one initial projection image, can be determined as a function of the streak artifacts in the at least one initial slice image. In particular, the inventors have found that, by determining at least one variation projection image on the basis of the at least one variation slice image, it is possible to determine those pixel values in the plurality of initial projection images which are the cause of the streak artifacts. In particular, these pixel values describe the projection of the object which causes the streak artifacts. The inventors have found that this method prevents objects in the initial projection images from being masked out solely on the basis of the corresponding pixel value, even if they have no influence on the streak artifacts. It is also advantageously possible to mask out these pixels if the corresponding object is not correctly represented in the initial slice image.

According to a further embodiment of the invention, the variation algorithm comprises a determination of a derivative of a total variation of the at least one initially reconstructed slice image.

In particular, the derivative of the total variation makes it possible to determine the variation of the voxel values between adjacent voxels of the initial slice image. The total variation is the sum of the quadratic deviations of the voxel values of all adjacent voxels in the voxel matrix of the at least one initial slice image. In order to calculate a voxel value of the variation slice image, the total variation is derived according to the corresponding voxel. In other words, each voxel value of the variation slice image therefore describes the influence of the corresponding voxel in the initial slice image on the total variation.

The voxel matrix of the initial slice image is advantageously exactly the same size as a voxel matrix of the variation slice image.

The inventors have found that the derivative of the total variation according to the individual voxels describes information about the variation or deviation of the Hounsfield units or the intensity value between adjacent voxels in the at least one initial slice image. The inventors have also found that the variation of the intensity values or the Hounsfield units between adjacent voxels comprises information about streak artifacts that are present.

According to a further embodiment of the invention, the computer-implemented method for the correction of streak artifacts in slice images comprises a method step for pre-processing the initially reconstructed slice image using a segmenting algorithm, said method step of preprocessing being executed before the first determination.

A segmenting algorithm comprises, for example, the segmentation of an object in a slice image on the basis of the voxel values within the object that is represented in the voxel matrix. In other words, a segmenting algorithm can be based on a threshold-value segmentation. A threshold-value segmentation results in a classification of the voxels with reference to the voxel values. In particular, the threshold value can be predefined such that all voxels whose voxel values lie above the threshold value are classified as belonging to the object, and all voxels whose voxel values lie below the threshold value are classified as lying outside the object. Alternatively, all voxel values lower than the threshold value can belong to the object to be segmented and all voxel values higher than the threshold value can lie outside the object to be segmented.

Alternatively, for example, the segmenting algorithm can be based on segmentation with reference to edges in a slice image. In particular, edges can be detected by comparing the voxel values of two adjacent voxels. A jump of more than a specified limit value between two voxel values of two adjacent voxels can indicate an edge. The limit value can be, for example, the one-sigma interval around the mean value of all voxel values. Alternatively, for example, the comparison can comprise the determination of a derivative along the voxels. Away from edges, the derivative is close to zero. At an edge, the derivative deviates significantly from zero. Similarly, a limit value can also be specified here for the value of the derivative with effect from which an edge is detected. The edge can be used as a boundary for the segmentation of an object. Voxels on one side of the edge can be classified as "not belonging to the object" while voxels on the other side of the edge can be classified as "belonging to the object". The classification here can also take place on the basis of the intensity values.

The object can be a partial region of the examination object in both embodiment variants of the segmenting algorithm. Alternatively, the object can be an object which is in contact with the examination object such that the projection of the object is visible on at least some of the initial projection images.

In particular, the segmenting algorithm can be used to segment parts or regions or objects of the initial slice image, in which the streak artifacts are particularly clearly visible. The segmented object or voxel values which describe the segmented object are kept unchanged in the preprocessed initial slice image. In particular, more than one object can be segmented. Voxel values in regions of the voxel matrix of the initial slice image outside the segmented object can be replaced by e.g. interpolation values from an interpolation. Alternatively, these regions or voxel values of the initial slice image can be replaced by zero values or NaN values.

The inventors have found that a segmentation of those regions in the initial slice image in which the streak artifacts are particularly clearly visible is particularly advantageous for the correction of the streak artifacts. In particular, in this way, the variations between the plurality of voxel values can become particularly clear as a result of the streak artifacts in the variation slice image. Therefore the influence of the streak artifacts also becomes particularly clear.

According to a further embodiment of the invention, the segmenting algorithm comprises a soft tissue segmentation.

In particular, soft tissue in the initial slice image is not a highly absorbent structure or structure having high X-ray density. Soft tissue absorbs less than bone or metal in particular. Therefore the voxel values or Hounsfield units for soft tissue are smaller than for more absorbent materials such as bone or metal. In particular, as described above, a threshold-value segmentation can be used to distinguish and segment the soft tissue in the initial slice image from objects having high X-ray density. Alternative methods for segmentation of the soft tissue are conceivable.

In particular, segmentation of the soft tissue means that all voxel values which do not represent soft tissue are identified. These can then be replaced by zero values, NaN values or interpolation values. In particular, when segmenting the soft tissue, the voxel values which represent the soft tissue are not changed.

The inventors have found that the streak artifacts are visible in particular in the soft tissue of the initial slice image. In particular, the derivative of the total variation of the voxels in which soft tissue is depicted without streak artifacts is negligible. The soft tissue without streak artifacts produces a continuous distribution of intensity or Hounsfield units over the voxels.

Furthermore, the inventors have found that it is advantageous to determine the derivative of the total variation in particular in those regions of the initial slice image in which the streak artifacts are particularly clear. It is thereby possible to ensure that the derivative of the total variation and therefore the variation slice image describes in particular the variation in the intensity or Hounsfield units which is caused by the streak artifacts.

Furthermore, the inventors have found that objects having high X-ray density such as a bone, in particular at an edge of the bone or at a transition of the bone to soft tissue, cause a significant jump in the intensity or Hounsfield units in the voxel values. The intensity jump is particularly visible in those voxel values of the voxel matrix which represent the edge of the bone. The intensity jump at the edge of the bone, for example, results in a high value in the derivative of the total variation. However, since the derivative of the total variation is intended in particular to determine the streak artifacts, it is advantageous before determining the derivative of the total variation to remove objects having high X-ray density from the at least one slice image by segmenting the soft tissue.

Furthermore, the inventors have found that the streak artifacts in voxel values which represent the bone are barely visible. Therefore these voxel values do not contribute to determining the source of the streak artifacts.

According to a further embodiment of the invention, the method step of the third determination of the computer-implemented method for the correction of streak artifacts in a slice image comprises a method step of a fourth determination of at least one variation mask, the at least one variation mask being based on the at least one variation projection image.

In particular, the variation mask can be a binary mask. In other words, the pixel values of the variation mask can be zero ('0') and one ('1') or 'True' and 'False'. In other words, the pixel values can comprise two classes. In particular, the variation mask can comprise the same number of pixels as the at least one variation projection image. The pixel matrix of the variation mask is advantageously exactly the same size as the pixel matrix of the variation projection image.

A threshold value for the pixel values in the variation projection image can advantageously be specified. In preferred embodiments, a pixel value of a pixel in the variation mask, whose corresponding pixel in the variation projection image has a pixel value greater than the threshold value, is set to zero or 'False'. All other pixel values of the variation mask can be set to one or 'True'. "Corresponding pixel" means that the corresponding pixel in the pixel matrix of the variation mask is arranged at the same position as the corresponding pixel in the pixel matrix of the variation projection image.

In alternative embodiments, the pixel values of the pixel in the variation mask whose corresponding pixels in the variation projection image comprise a pixel value smaller than the threshold value can be set to zero or 'False' in the corresponding pixel of the variation mask. In this case, all other pixel values of the variation mask are then set to one or 'True'.

In preferred embodiments, morphological operations are performed on the variation mask. In particular, operations such as the closing of "holes" in the pixel values of the variation mask can be performed. Holes in the pixel values can be, for example, individual pixels or smaller contiguous regions of pixels of one class within a large contiguous region of pixels of the other class. The pixels of the smaller region can subsequently be assigned to the other class. Holes can occur, for example, when pixel values are changed due to noise in such a way that they are assigned to the wrong class during the threshold value-based segmentation.

Alternatively, the corresponding morphological operations can be performed on the variation projection image before the determination of the variation mask.

The inventors have found that the pixel values of the pixels of the variation projection image comprise information about which pixel in the initial projection image has what degree of influence on the streak artifacts. The inventors have found that it is advantageous to translate this information into a binary form in the variation mask. In particular, the inventors have found that the binary form categorizes the pixels into two classes. The one class comprises those pixels which, according to the classification, have an influence on the streak artifacts. The other class comprises those pixels which, according to the classification, have no influence on the streak artifacts. The influencing pixels in the variation mask advantageously comprise a pixel value of zero or 'False' and the other pixels have a pixel value of one or 'True'. In particular, the inventors have found that the translation into a binary mask can be realized using a threshold value on the basis of the at least one variation projection image. In particular, the inventors have found that the choice of the threshold value effectively specifies how significant the influence of a pixel value on the streak artifacts must be in order to be classified in the mask as a pixel with or without influence.

According to a further embodiment of the invention, the method step of the third determination further comprises a method step of a fifth determination of at least one corrected projection image on the basis of at least one initial projection image and the at least one variation mask, and a method step of a sixth determination of the at least one corrected slice image as a function of the at least one corrected projection image.

In particular, the variation projection image can correspond to an initial projection image from the plurality of initial projection images. In other words, the same examination object from the same recording angles can be depicted in the mutually corresponding pixels of the variation projection image and the initial projection image. The type of depiction and in particular the pixel values may differ in the variation projection image and the initial projection image. In particular, a pixel value of a pixel in the variation projection image describes the influence according to prior classification of the corresponding pixel value of a pixel in the corresponding initial projection image on the streak artifacts in the initial slice image. In particular, the at least one variation mask can then correspond to at least one initial projection image. In particular, the variation mask corresponds to a variation projection image. In other words, the at least one variation mask is determined on the basis of the at least one variation projection image. In particular, the variation mask then corresponds to the initial projection image which corresponds to the variation projection image.

In particular, a slice image can be determined from a plurality of projection images via filtered back projection. In particular, the projection images are filtered first, and then the filtered projection images are back-projected in this case. A filter for filtering the projection images can be a ramp filter, for example. In particular, this means that from each initial projection image of the plurality of initial projection images, it is possible to determine a filtered projection image of a plurality of filtered initial projection images. In particular, the variation mask can then correspond to the filtered initial projection image, which is determined from the initial projection image corresponding thereto. In particular, the expression "filtered projection images" can also be used synonymously with "filtered initial projection images".

In particular, the corrected projection image can be the result of a pixel-level multiplication of the corresponding filtered initial projection image with the corresponding variation mask. During the pixel-level multiplication, those pixel values of the filtered initial projection image which have a significant influence according to prior classification on the streak artifacts in the initial slice image are advantageously multiplied by a zero value (or a 'False' value) of the variation mask. In particular, it is then possible to speak of a corrected projection image which corresponds to the initial projection image or to the filtered projection image. In particular, the multiplication of the variation mask with the corresponding filtered initial projection image corresponds to a masking out of the pixel values which have an influence according to prior classification on the streak artifacts.

Embodiments can also provide for the zero values of the pixel values in the corrected projection image to be replaced by an interpolation of pixel values.

In this way, all pixel values of those pixels in the plurality of filtered initial projection images which have an influence according to prior classification on the streak artifacts in the initial slice image can advantageously be replaced by zero values or by interpolated pixel values.

In particular, the filtered initial projection image which corresponds to the corrected projection image can be replaced by the corrected projection image in the plurality of filtered initial projection images (or at least in some of the plurality of filtered initial projection images). In particular, a plurality of corrected projection images can be determined in this way. In particular, the plurality of corrected projection images can comprise filtered initial projection images in which no pixel values have an influence on the streak artifacts. In other words, the plurality of corrected projection images can comprise filtered initial projection images for which no corrected projection images were determined.

In particular, the at least one corrected slice image can be determined from the plurality of corrected projection images. The at least one corrected slice image is advantageously determined from the plurality of corrected projection images via back projection.

The inventors have found that by masking out those pixels in the plurality of filtered initial projection images which have an influence according to prior classification on the streak artifacts in the initial slice image, a plurality of corrected projection images can be determined. In particular, the masking out can be performed by the at least one variation mask in the corresponding filtered initial projection image. This means that it is advantageously also possible to mask out pixels that describe an object which has high X-ray density but is not visible in every initial projection image of the plurality of initial projection images. Objects which are not visible in every initial projection image cannot be correctly represented in the initial slice image in particular, and therefore cannot be masked out directly in the initial slice image. It is therefore advantageous to mask out these objects in the filtered initial projection images which are based on the initial projection images.

Furthermore, the inventors have found that it is advantageous to apply the variation mask to the corresponding filtered initial projection image. In other words, the inventors have found that it is advantageous to perform the filtering of the filtered back projection before the application of the variation mask. In particular, it is thus possible to prevent artifacts which can occur as a result of filtering after the variation mask is applied to the corresponding initial projection image.

According to an alternative embodiment of the invention, the method step of the third determination comprises a method step of a second reception of the plurality of initial projection images and the at least one variation mask or the at least one variation projection image, and a method step of a first application of a trained function to the plurality of initial projection images and the at least one variation mask or the at least one variation projection image, wherein the at least one corrected slice image is generated.

In particular, the method step of the second reception can comprise the reception of the plurality of initial projection images and the at least one variation projection image. In particular, the plurality of initial projection images and the at least one variation image can then be designated as input data.

Alternatively, the method step of the second reception can comprise the reception of the plurality of initial projection images and the at least one variation mask. In particular, the plurality of initial projection images and the at least one variation mask can then be designated as input data.

The trained function is advantageously applied to the received input data.

In general, the trained function emulates cognitive functions which humans associate with the human mind. In particular, as a result of training which is based on training data, the trained function is able to adapt to new circumstances and to recognize and extrapolate patterns.

As a rule, parameters of the trained function can be adapted by way of training. In particular, supervised training, semi-supervised training, unsupervised training, reinforcement learning and/or active learning can be applied. In addition to this, representation learning (also known as "feature learning") can be applied. In particular, the parameters of the trained functions can be adapted iteratively via a plurality of training steps.

In particular, a trained function can comprise a neural network, a support vector machine, a decision tree and/or a Bayesian network, and/or the trained function can be based on k-means clusters, Q-learning, genetic algorithms and/or association rules. In particular, a neural network can be a deep neural network, a convolutional neural network or a convolutional deep neural network. Furthermore, a neural network can be an adversarial network, a deep adversarial network and/or a generative adversarial network.

In particular, the trained function can determine at least one metal mask on the basis of the corresponding input data. The at least one metal mask corresponds to an initial projection image. In particular, the at least one metal mask is used to mask out pixel values which represent metal in the corresponding initial projection image. In particular, pixel values of the metal mask which represent metal in the corresponding initial projection image metal can comprise '1' or 'True'. All other pixel values of the metal mask can comprise '0' or 'False'. Alternatively, the pixel values of the metal mask can be transposed. The trained function advantageously determines a metal mask for each projection image of the initial projection images. By applying the metal mask to the corresponding filtered initial projection image, it is possible to determine at least one corrected projection image. In particular, a plurality of corrected projection images can be determined. In particular, the corrected slice image can be generated from the plurality of corrected projection images via back projection.

Alternatively, the trained function can determine the at least one corrected slice image on the basis of the corresponding input data. In particular, the at least one corrected slice image has no streak artifacts or has reduced streak artifacts in comparison with the initial slice image.

In relation to the developments of embodiments of the invention which include a trained function, an embodiment of the invention further relates to a method for providing a trained function. The method for providing the trained function can comprise a third reception of a plurality of initial projection images and at least one variation mask or at least one variation projection image. Furthermore, the method can comprise a fourth reception of at least one metal mask, the at least one metal mask being associated with the plurality of initial projection images and with the at least one variation mask or the at least one variation projection image.

Furthermore, the method can comprise a first training of a function on the basis of the at least one metal mask and the plurality of initial projection images and the at least one variation mask or the at least one variation projection image.

Alternatively, in relation to the alternative developments of embodiments of the invention which include a trained function, an embodiment of the invention can also relate to a method for providing a trained function. The method for providing the trained function can comprise a third reception of a plurality of initial projection images and at least one variation mask or at least one variation projection image. Furthermore, the method can comprise a fourth reception of at least one corrected slice image, the at least one corrected slice image being associated with the plurality of initial projection images and with the at least one variation mask or the at least one variation projection image. Furthermore, the method can comprise a first training of a function on the basis of the at least one corrected slice image and the plurality of initial projection images and the at least one variation mask or the at least one variation projection image.

In particular, in relation to the development of an embodiment of the invention which includes a trained function, an embodiment of the invention can comprise a method for providing a trained function. The method for providing the trained function can comprise a third reception of a plurality of initial projection images and at least one variation mask. Furthermore, the method can comprise a fourth reception of at least one metal mask, the at least one metal mask being associated with the plurality of initial projection images and the at least one variation mask. Furthermore, the method can comprise a first training of a function on the basis of the at least one metal mask and the plurality of initial projection images and the at least one variation mask.

Alternatively, in relation to the development of embodiments of the invention which includes a trained function, an embodiment of the invention can comprise a method for providing a trained function. The method for providing the trained function can comprise a third reception of a plurality of initial projection images and at least one variation projection image. Furthermore, the method can comprise a fourth reception of at least one metal mask, the at least one metal mask being associated with the plurality of initial projection images and the at least one variation projection image. Furthermore, the method can comprise a first training of a function on the basis of the at least one metal mask and the plurality of initial projection images and the at least one variation projection image.

In particular, in relation to the alternative development of embodiments of the invention which includes a trained function, an embodiment of the invention can comprise a method for providing a trained function. The method for providing the trained function can comprise a third reception of a plurality of initial projection images and at least one variation mask. Furthermore, the method can comprise a fourth reception of at least one corrected slice image, the at least one corrected slice image being associated with the plurality of initial projection images and the at least one variation mask. Furthermore, the method can comprise a first training of a function on the basis of the at least one corrected slice image and the plurality of initial projection images and the at least one variation mask.

Alternatively, in relation to the alternative development of embodiments of the invention which includes a trained function, an embodiment of the invention can comprise a method for providing a trained function. The method for providing the trained function can comprise a third reception of a plurality of initial projection images and at least one variation projection image. Furthermore, the method can comprise a fourth reception of at least one corrected slice image, the at least one corrected slice image being associated with the plurality of initial projection images and the at least one variation projection image. Furthermore, the method can comprise a first training of a function on the basis of the at least one corrected slice image and the plurality of initial projection images and the at least one variation projection image.

In particular, an embodiment of the invention also relates to a streak artifact correction unit. The streak artifact correction unit comprises an interface and a computing unit. In this case, the interface is designed for the first reception of at least one initially reconstructed slice image and a plurality of initial projection images, the at least one initially reconstructed slice image being based on the plurality of initial projection images. In this case, the computing unit is designed for the first determination of at least one variation slice image using a variation algorithm, for the second determination of at least one variation projection image on the basis of the at least one variation slice image, and for the third determination of at least one corrected slice image as a function of the at least one variation projection image.

Such a streak artifact correction unit can be designed in particular to execute an embodiment of the method described above for the correction of streak artifacts in slice images. The streak artifact correction unit is designed to execute this method in that the interface and the computing unit are designed to execute the corresponding method steps.

At least one embodiment of the invention also relates to a computer program product with a computer program and a computer-readable medium. A largely software-based implementation has the advantage that streak artifact correction units already in use can easily be upgraded via a software update in order to work in the way described. In addition to the computer program, such a computer program product can optionally comprise additional elements such as e.g. documentation and/or additional components, as well as hardware components such as e.g. hardware keys (dongles, etc.) for using the software.

According to an embodiment of the invention, the streak artifact correction unit is further designed to execute an embodiment of the method described above for the correction of streak artifacts in slice images.

In particular, at least one embodiment of the invention relates to a computed tomography device comprising the streak artifact correction unit described above.

In particular, at least one embodiment of the invention also relates to a computer program product with a computer program which can be loaded directly into a memory of a streak artifact correction unit, with program sections for executing all steps of an embodiment of the method described above for the correction of streak artifacts in slice images when the program sections are executed by the streak artifact correction unit.

In particular, at least one embodiment of the invention further relates to a computer-readable storage medium on which are stored program sections that can be read and executed by a streak artifact correction unit in order to execute all steps of an embodiment of the method described above for the correction of streak artifacts in slice images when the program sections are executed by the streak artifact correction unit.

FIG. 1 shows a flow diagram of a first example embodiment of the method for the correction of streak artifacts in slice images.

The first method step of the illustrated first example embodiment is the first reception REC-1 of at least one initially reconstructed slice image via an interface 701. In this case, the interface 701 is part of a processor. The initially reconstructed slice image can be reconstructed on the basis of a plurality of initial projection images. In the example embodiments shown here of the method for the correction of streak artifacts in slice images, the plurality of initial projection images is based on an X-ray examination. In other words, the plurality of initial projection images is a plurality of X-ray images.

The plurality of initial projection images was advantageously recorded using a computed tomography device, a C-arm or an alternative X-ray tomography device. Alternatively, the plurality of initial projection images can be a plurality of projection images from a magnetic resonance tomography examination, a positron emission tomography examination, a single-photon emission tomography examination, a sonography or ultrasound examination, etc. In particular, each of the plurality of initial projection images is recorded from a recording angle relative to an examination object. The recording angle describes the angle from which the examination object is projected onto an initial projection image. In particular, the recording angles of the plurality of initial projection images are mutually different. In particular, in the example embodiments described, the initial slice image can be determined from the plurality of initial projection images via a filtered back projection.

The second method step of the illustrated first example embodiment is the first determination DET-1 of at least one variation slice image by a computing unit 602 using a variation algorithm. The computing unit 602 is part of the processor in this case. The variation slice image is based on the at least one initial slice image in this case. In particular, the variation slice image can be determined by way of the derivative of the total variation of the initial slice image.

The initial slice image comprises a volume of the size $$N = n_x \times n_y \times n_z,$$

where $n_x$ is the number of voxels in x-direction, $n_y$ the number of voxels in y-direction and $n_z$ the number of voxels in z-direction of the initial slice image.

The voxel values of the initial slice image are given by $v_i$, where $i=1, \ldots, N$. The voxels in this case are advantageously numbered consecutively according to the rows in the x/y planes. The numbering of the x/y planes is continued in the z-direction.

The total variation $TV_{ges}$ of the initial slice image can be calculated using $$TV_{ges} = \sum_{i=1}^{N} TV(v_i)$$

where $$TV(v_i) = \sqrt{y(vx_i)^2 + (vy_i)^2 + (vz_i)^2 + \varepsilon}.$$

In this case, $vx_i = v_{i+1} - v_i,$ $vy_i = v_{i+nx} - v_i,$ $vz_i = v_{i+nx \times ny} - v_i,$ and $\varepsilon$ is any very small number such that $TV(v_i)$ is not zero.

The derivative of the total variation can therefore be calculated using $$-\frac{\partial TV_{ges}}{\partial v_i} = \frac{vx_i + vy_i + vz_i}{TV(v_i)} - \frac{vx_{i-1}}{TV(v_{i-1})} - \frac{vy_{i-nx}}{TV(v_{i-nx})} - \frac{vz_{i-nx \times ny}}{TV(v_{i-nx \times ny})}.$$

Each voxel value $v'_i$ of the variation slice image at the position of the corresponding voxel $v_i$ can therefore be calculated as $$-\frac{\partial TV_{ges}}{\partial v_i}.$$

The third method step of the illustrated first example embodiment is the second determination DET-2 of at least one variation projection image on the basis of the at least one variation slice image. In particular, the at least one variation projection image can be determined from the variation slice image via an inverse function of the filtered back projection. This inverse function is also known as forward projection. A corresponding variation projection image is advantageously determined for each initial projection image via the forward projection. In this case, each of the variation projection images corresponds respectively to an initial projection image.

Two mutually corresponding projection images show different representations of the examination object from the same recording angle. This means that the at least one variation projection image determined in this way indicates the extent to which the pixel values of the corresponding initial projection image cause streak artifacts in the initial slice image, since the streak artifacts in the initial slice image result in significant variation between the voxels of the initial slice image. This variation gives rise to large values in the variation slice image and therefore likewise to large values in the corresponding pixels of the at least one variation projection image. Large values signify, for example, that the corresponding pixel value of the variation projection image lies outside a one-sigma interval around the mean value of all pixel values of the variation projection image.

The fourth method step of the illustrated first example embodiment is the third determination DET-3 of at least one corrected slice image as a function of the at least one variation projection image and at least some of the plurality of initial projection images.

Figure 2:
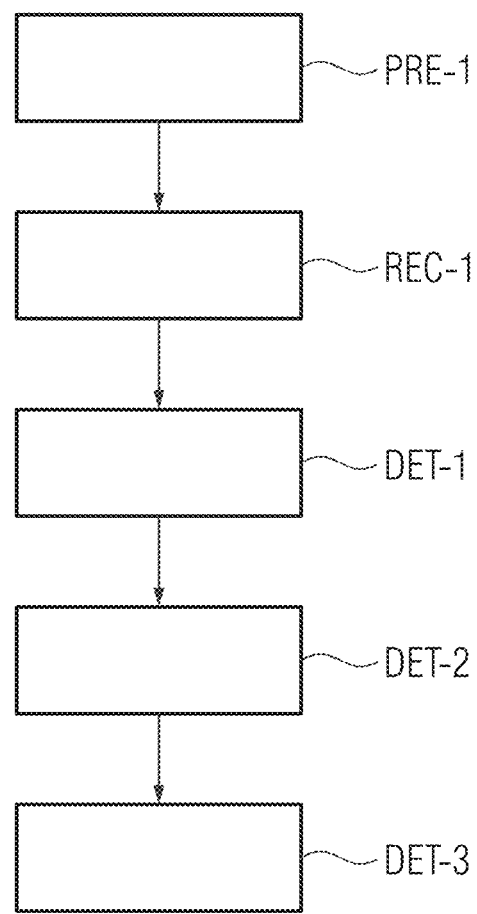
FIG. 2 shows a flow diagram of a second example embodiment of the method for the correction of streak artifacts in slice images.

FIG. 2 shows a flow diagram of a second example embodiment of the method for the correction of streak artifacts in slice images. The method steps of the first reception REC-1, the first determination DET-1, the second determination DET-2 and the third determination DET-3 are performed in a similar manner to the description of the first example embodiment.

Before the first reception REC-1, the method step of preprocessing PRE-1 the initial slice image using a segmenting algorithm is performed. In particular, the segmentation algorithm comprises a soft tissue segmentation. The segmentation of the soft tissue can be performed on the basis of the intensity values or voxel values of the initial slice image.

In particular, a threshold value can be specified for the intensity values that are used to segment the soft tissue. In particular, voxels with intensity values below the threshold value can be segmented as soft tissue. Voxels with intensity values above the threshold value can be segmented as not belonging to the soft tissue. Voxels with intensity values above the threshold value can be replaced by zero values or by NaN values. Alternatively, the intensity values of these voxels can be replaced by interpolation values. An interpolation for determining the interpolation values can be performed between voxel regions that have been segmented as soft tissue.

The segmentation of the soft tissue makes it possible to remove intensity variations which result in high values of the derivative of the total variation but are not produced by streak artifacts. Such intensity variations in the at least one initial slice image can be caused in particular by bone or other structures which are highly absorbent in comparison with soft tissue, or structures having high X-ray density. In particular, the streak artifacts in voxel regions which represent the projection of such objects are not very obvious and therefore have only a slight influence on the derivative of the total variation.

Figure 3:
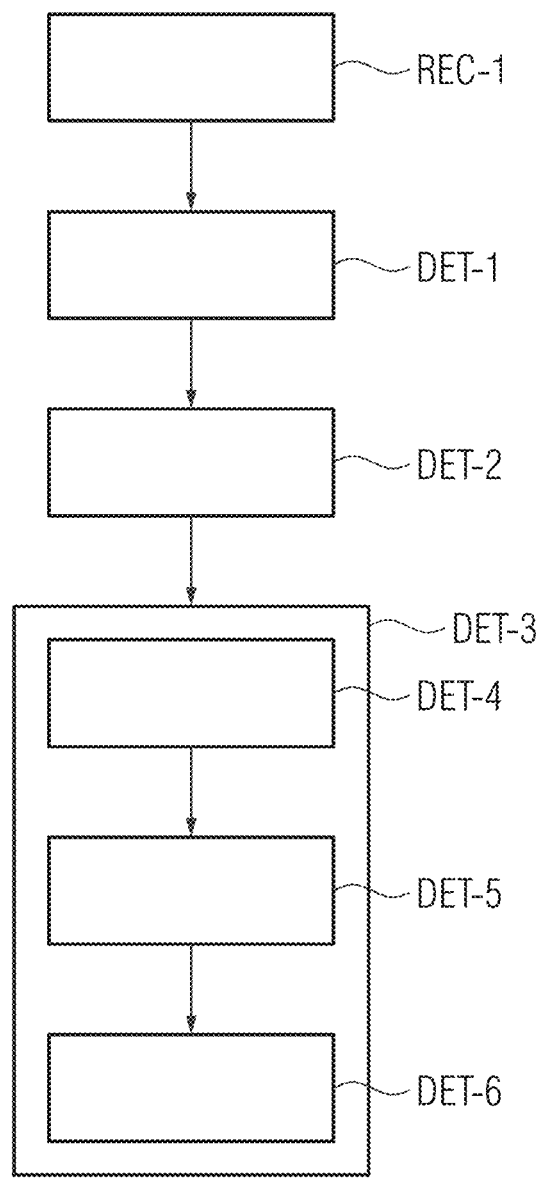
FIG. 3 shows a flow diagram of a third example embodiment of the method for the correction of streak artifacts in slice images.

FIG. 3 shows a flow diagram of a third example embodiment of the method for the correction of streak artifacts in slice images. The method steps of the first reception REC-1, the first determination DET-1, the second determination DET-2 and the third determination DET-3 are performed in a similar manner to the description of the first example embodiment. Embodiments of the method can also comprise the preprocessing PRE-1 of the initial slice image.

In the illustrated third example embodiment, the method step of the third determination DET-3 comprises three further method steps: the method steps of the fourth determination DET-4, the fifth determination DET-5 and the sixth determination DET-6.

The method step of the fourth determination DET-4 comprises the determination of at least one variation mask, the at least one variation mask being based on the at least one variation projection image. The at least one variation mask is based in particular on the pixel values of the at least one variation projection image. In particular, the variation mask is advantageously binary. In other words, the pixels of the variation mask advantageously comprise the pixel value '1' or 'True' at those positions which have a low pixel value in the variation projection image, and the pixel value '0' or 'False' at the other positions. In other words, the pixels of the variation projection value can be divided into two classes.

In particular, a threshold value can be specified for the purpose of creating the at least one variation mask, as in the case of the segmentation of the soft tissue described above. The threshold value is used to sort the pixel values of the variation projection image into the two categories '1' or 'True' and '0' or 'False' of the variation mask.

In advantageous embodiments, a variation mask is determined for each of the variation projection images determined in the method step of the second determination DET-2. It is advantageously possible to perform at least one morphological operator on the variation mask determined thus. In particular, the morphological operator can be designed to homogenize the variation mask.

In other words, holes in the variation mask can be closed by the morphological operator. Holes can be small non-contiguous pixel regions of one class which are situated within a large pixel region of the other class. Such small pixel regions can be assigned to the large pixel region via the morphological operator. In other words, the classification by way of the threshold value can be corrected or improved by the morphological operator. The sensitivity of this correction can be specified using parameters of the morphological operator. The sensitivity determines, for example, the maximum allowable size for such holes to be closed by the morphological operator.

In the method step of the fifth determination DET-5, at least one corrected projection image is determined on the basis of at least some of the plurality of initial projection images and the at least one variation mask. Firstly, each initial projection image from the plurality of initial projection images is filtered. In other words, a plurality of filtered initial projection images is determined. The filtering is part of the filtered back projection by which a slice image can be determined from a plurality of projection images. In particular, the filter can be a ramp filter.

In the illustrated example embodiment, the at least one corrected projection image is determined by the pixel-level multiplication of the at least one variation mask and the corresponding filtered initial projection image.

In addition, those regions of the corrected projection image which were set to zero in the at least one variation mask as a result of the multiplication by zero or 'False' values can be replaced by interpolation values. The interpolation values can be determined by interpolation between those pixel regions of the corrected projection image which were not changed by the mask. As a result of the method step of the fifth determination DET-5, those pixel values in the filtered initial projection image which cause streak artifacts in the initial slice image are masked out.

In advantageous embodiments, each filtered initial projection image from the plurality of filtered initial projection images is multiplied at pixel level by the corresponding variation mask. In particular, it is thereby possible to determine a plurality of corrected projection images. The plurality of corrected projection images corresponds to the plurality of filtered initial projection images, wherein in the plurality of corrected projection images, each filtered initial projection image is replaced by its corresponding corrected projection image if a corresponding corrected projection image has been determined. In advantageous embodiments, for the purpose of determining the plurality of corrected projection images, each of the filtered initial projection images is replaced by its corresponding corrected projection image.

The method step of the sixth determination DET-6 comprises the determination of the at least one corrected slice image as a function of the at least one corrected projection image. The at least one corrected slice image is advantageously determined on the basis of the plurality of corrected projection images. The corrected slice image is determined from the plurality of corrected projection images via back projection.

Figure 4:
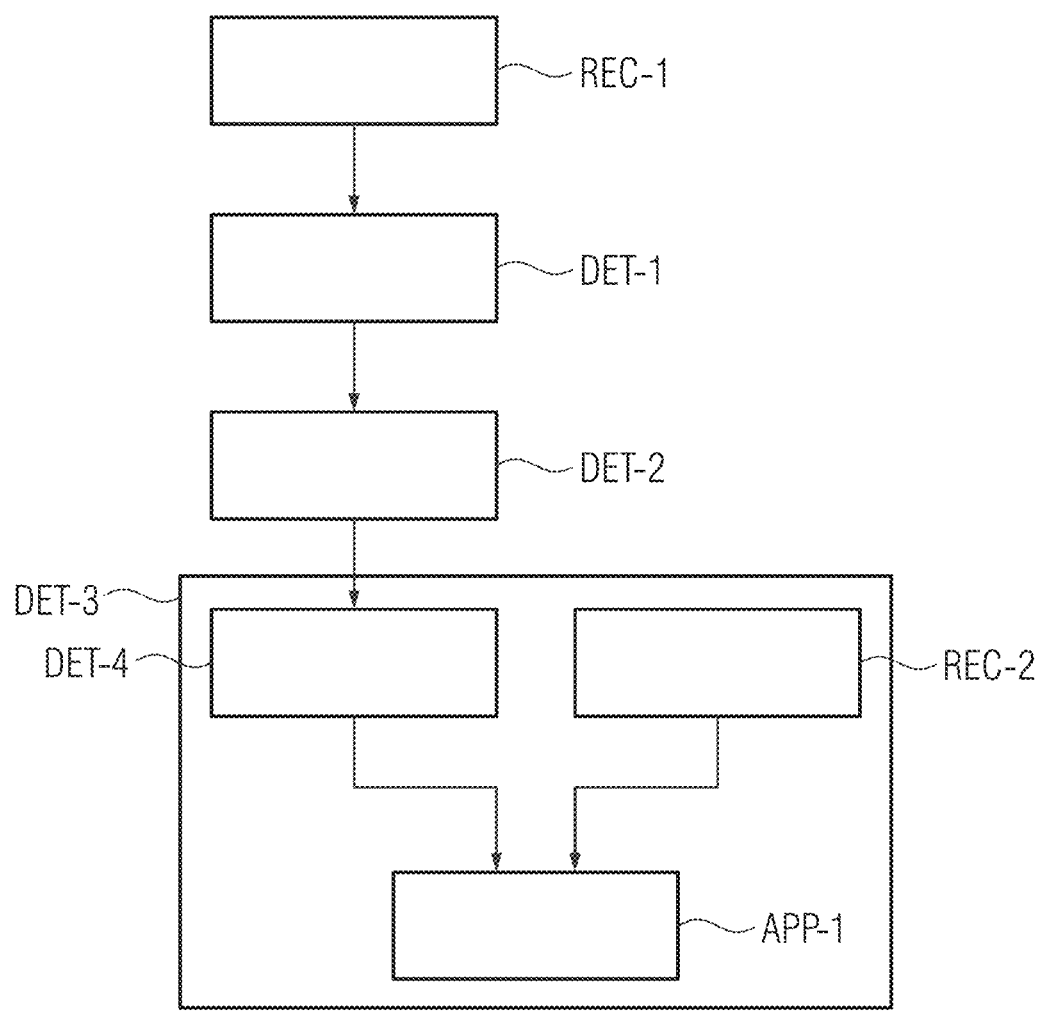
FIG. 4 shows a flow diagram of a fourth example embodiment of the method for the correction of streak artifacts in slice images.

FIG. 4 shows a flow diagram of a fourth example embodiment of the method for the correction of streak artifacts in slice images. The method steps of the first reception REC-1, the first determination DET-1, the second determination DET-2 and the third determination DET-3 are performed in a similar manner to the description of the first example embodiment. The method step of the fourth determination DET-4 is performed in a similar manner to the third example embodiment.

In the method step of the second reception REC-2, the plurality of initial projection images is received.

The plurality of initial projection images and the at least one variation mask are supplied as input data to a trained function, which is applied to the input data in the method step of the first application APP-1. As a result of the application APP-1 of the trained function, the at least one corrected slice image is determined.

In particular, the trained function can determine at least one metal mask for an initial projection image. A metal mask can advantageously be determined for each projection image of the plurality of initial projection images. A corrected projection image can be determined by multiplying the corresponding filtered initial projection image with the at least one metal mask. In particular, in a similar manner to the example embodiments described above, a plurality of corrected projection images can be determined. In particular, the corrected slice image can be determined on the basis of the plurality of corrected projection images.

Figure 5:
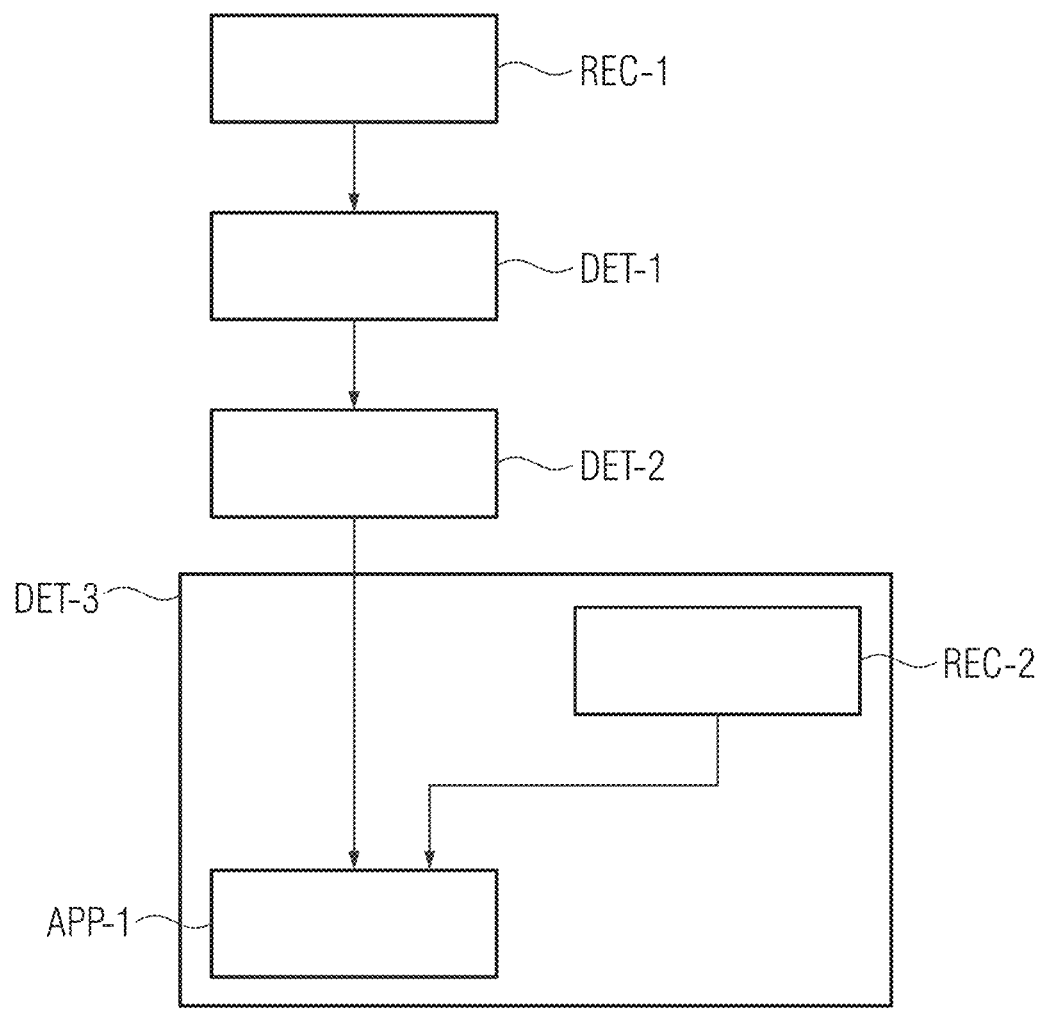
FIG. 5 shows a flow diagram of a fifth example embodiment of the method for the correction of streak artifacts in slice images.

FIG. 5 shows a flow diagram of a fifth example embodiment of the method for the correction of streak artifacts in slice images. The method steps of the first reception REC-1, the first determination DET-1, the second determination DET-2 and the third determination DET-3 are performed in a similar manner to the description of the first example embodiment.

The plurality of initial projection images and the at least one variation projection image are supplied as input data to a trained function, which is applied to the input data in the method step of the first application APP-1. As a result of the application APP-1 of the trained function, the at least one corrected slice image is determined in a similar manner to the description for FIG. 4.

Figure 6:
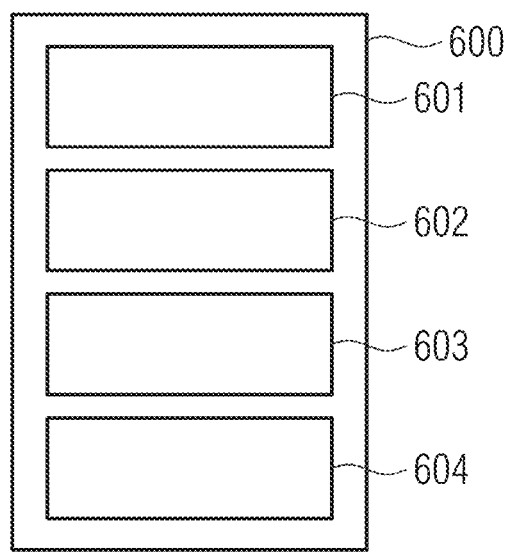
FIG. 6 shows a streak artifact correction unit.

FIG. 6 shows a streak artifact correction unit 600 for determining a reference dose parameter. The streak artifact correction unit 600 shown here is configured to execute a method according to the invention. This streak artifact correction unit 600 comprises an interface 601, a computing unit 602, a memory unit 603 and an input/output unit 604.

The streak artifact correction unit 600 can be in particular a computer, a microcontroller or an integrated circuit. Alternatively, the streak artifact correction unit 600 can be a real or virtual group of computers (a real group is known as a "cluster", and a virtual group as a "cloud").

An interface 601 can be a hardware or software interface (e.g. PCI bus, USB or Firewire). A computing unit 602 can have hardware elements or software elements, e.g. a microprocessor or a so-called FPGA (Field Programmable Gate Array). A memory unit 603 can be realized as non-permanent working memory (Random Access Memory: RAM) or as permanent mass memory (hard disk, USB stick, SD card, solid state disk). An input/output unit 604 comprises at least one input unit and/or at least one output unit.

Figure 7:
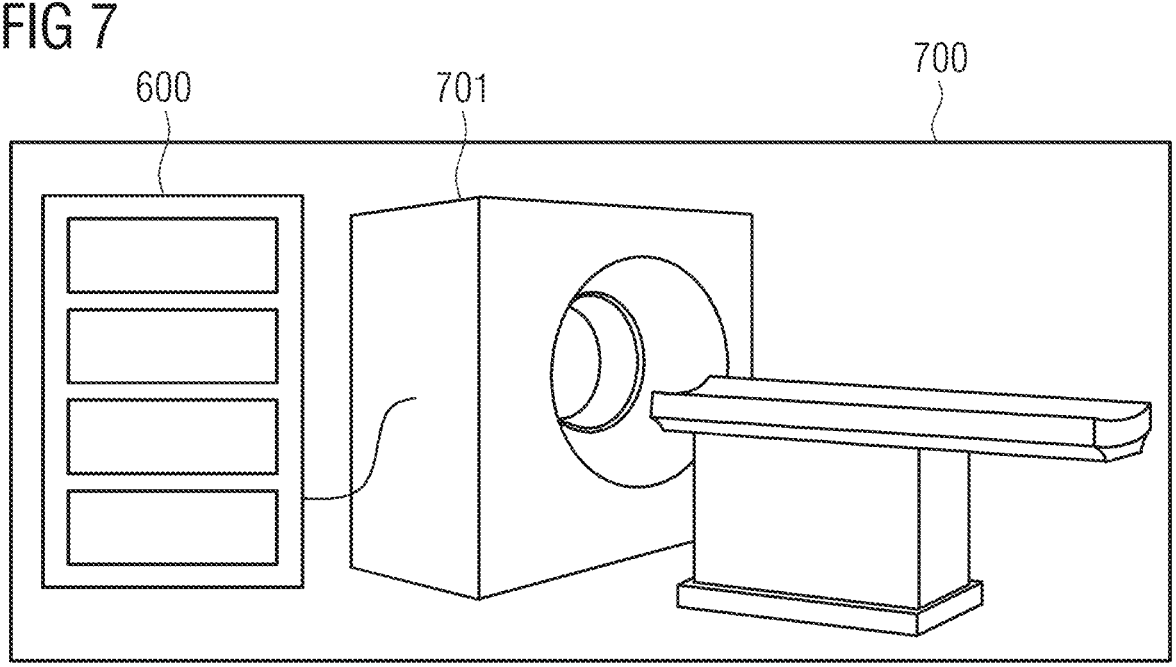
FIG. 7 shows a schematic view of a medical imaging system comprising the streak artifact correction unit for the correction of at least one initial slice image.

FIG. 7 shows a schematic view of a medical imaging system 700 comprising the streak artifact correction unit 600 which is designed to execute one of the methods described in the FIGS. 1 to 5. The medical imaging system 700 comprises means for performing a medical imaging examination such as a computer tomography examination (CT), a magnetic resonance tomography examination (MRT), a positron emission tomography examination (PET), a single-photon emission computed tomography examination (SPECT), a C-arm examination and/or a sonography examination or ultrasound examination. By way of example, the medical imaging system 700 here comprises a computed tomography device or CT scanner 701, which is arranged and configured in such a way that it is able to perform at least computed tomography examinations.

The computed tomography device 701 is communicatively coupled to the medical imaging system 600 and can receive the clinical examination (the computed tomography examination in this case) selected by the medical imaging system 700. On the basis of stored values of clinical examinations (e.g. different types of CT/MRT/PET/SPECT/C-arm or sonography examinations) for a specified clinical question, which values have been derived and stored by the medical imaging system 700, the optimum clinical examination for the specified clinical question can be selected automatically and transferred to the computed tomography device 701.

Although the invention is illustrated and described in detail above with reference to the preferred example embodiments, the invention is not restricted thereby. Other variations and combinations can be derived therefrom by the person skilled in the art without departing from the essential idea of the invention. Advantages of the invention which are described in relation to one example embodiment also apply where transferable to other example embodiments without this being explicitly specified.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A computer-implemented method, comprising:
receiving at least one initially reconstructed slice image via a processor, the at least one initially reconstructed slice image being based on a plurality of initial projection images, and the at least one initially reconstructed slice image including a first initially reconstructed slice image having a plurality of voxels arranged in sets of adjacent voxels, each set of adjacent voxels including a first voxel having a first intensity value and a second voxel having a second intensity value, the first voxel and the second voxel being adjacent voxels of the first initially reconstructed slice image;
determining a total variation of the at least one initially reconstructed slice image based on a sum of deviations of intensity values between the first voxel and the second voxel of each set of adjacent voxels of an image area of the at least one initially reconstructed slice image;
determining at least one variation slice image by determining a derivative of the total variation of the at least one initially reconstructed slice image, via the processor, using a variation algorithm, the at least one variation slice image including a second plurality of voxels, each voxel of the second plurality of voxels of the variation slice image corresponding to a first voxel of a set of adjacent voxels, each voxel of the second plurality of voxels of the variation slice image having a variation value indicating a variation between a respective first intensity value and a respective second intensity value of a set of adjacent voxels;

determining at least one variation projection image based on the at least one variation slice image; and determining at least one corrected slice image as a function of the at least one variation projection image.

2. The computer-implemented method of claim 1, further comprising:

preprocessing the at least one initially reconstructed slice image using a segmenting algorithm, the preprocessing being before the determining of the at least one variation slice image using the variation algorithm.

3. The computer-implemented method of claim 1, wherein the determining of the at least one corrected slice image comprises:

determining at least one variation mask, the at least one variation mask being based on the at least one variation projection image.

4. A non-transitory computer program product storing a computer program, loadable into a memory of a streak artifact correction unit, the computer program including program sections for executing the method of claim 1 when the program sections are executed by the streak artifact correction unit.

5. A non-transitory computer-readable storage medium storing executable instructions that, when executed by one or more processors, cause the one or more processors to perform the method of claim 1.

6. The computer-implemented method of claim 1, wherein the determining of the at least one corrected slice image comprises:

receiving the plurality of initial projection images and at least one variation mask or the at least one variation projection image, and applying a trained function to the plurality of initial projection images and to the at least one variation mask or the at least one variation projection image, to determine the at least one corrected slice image.

7. The method of claim 1, wherein the sets of adjacent voxels are included in a plurality of voxels of the first initially reconstructed slice image, each voxel of the plurality of voxels has an intensity value, and the variation value is a derivative of the total variation.

8. The computer-implemented method of claim 2, wherein the segmenting algorithm includes a soft tissue segmentation configured to replace voxel values of the at least one initially reconstructed slice image with an intensity over a threshold value with a zero value.

9. The computer-implemented method of claim 2, wherein the determining of the at least one corrected slice image comprises:

determining at least one variation mask, the at least one variation mask being based on the at least one variation projection image.

10. The computer-implemented method of claim 3, further comprising:

determining at least one corrected projection image based on the at least one variation mask and at least one initial projection image of the plurality of initial projection images, wherein the at least one corrected slice image is determined as a function of the at least one corrected projection image.

11. The computer-implemented method of claim 3, wherein the determining of the at least one corrected slice image comprises:

receiving the plurality of initial projection images and the at least one variation mask or the at least one variation projection image, and applying a trained function to the plurality of initial projection images and to the at least one variation mask or the at least one variation projection image, to determine the at least one corrected slice image.

12. The computer-implemented method of claim 9, further comprising:

determining at least one corrected projection image based on the at least one variation mask and at least one initial projection image of the plurality of initial projection images, wherein the at least one corrected slice image is determined as a function of the at least one corrected projection image.

13. A streak artifact correction unit, comprising:

an interface configured to receive at least one initially reconstructed slice image and a plurality of initial projection images, the at least one initially reconstructed slice image being based on the plurality of initial projection images, and the at least one initially reconstructed slice image including a first initially reconstructed slice image having a plurality of voxels arranged in sets of adjacent voxels, each set of adjacent voxels including a first voxel having a first intensity value and a second voxel having a second intensity value, the first voxel and the second voxel being adjacent voxels of the first initially reconstructed slice image; and at least one processor configured to determine a total variation of the at least one initially reconstructed slice image based on a sum of deviations of intensity values between the first voxel and the second voxel of each set of adjacent voxels of an image area of the at least one initially reconstructed slice image, determine at least one variation slice image by determining a derivative of the total variation of the at least one initially reconstructed slice image using a variation algorithm, the at least one variation slice image including a second plurality of voxels, each voxel of the second plurality of voxels of the variation slice image corresponding to a first voxel of a set of adjacent voxels, each voxel of the second plurality of voxels of the variation slice image having a variation value indicating a variation between a respective first intensity value and a respective second intensity value of a set of adjacent voxels, determine at least one variation projection image based on the at least one variation slice image, and determine at least one corrected slice image as a function of the at least one variation projection image.

14. A computed tomography device comprising the streak artifact correction unit of claim 13.

15. The streak artifact correction unit of claim 13, wherein the processor is further configured to:

preprocess the at least one initially reconstructed slice image using a segmenting algorithm, the preprocessing being before the determining of the at least one variation slice image using the variation algorithm.

16. The streak artifact correction unit of claim 13, wherein the determining of the at least one corrected slice image comprises:
- determining at least one variation mask, the at least one variation mask being based on the at least one variation projection image.

17. The streak artifact correction unit of claim 15, wherein the segmenting algorithm includes a soft tissue segmentation.

18. The streak artifact correction unit of claim 16, wherein the processor is further configured to:
- determine at least one corrected projection image based on the at least one variation mask and at least one initial projection image of the plurality of initial projection images, wherein the at least one corrected slice image is determined as a function of the at least one corrected projection image.

* * * * *